(12) United States Patent
Yan

(10) Patent No.: US 7,141,922 B2
(45) Date of Patent: Nov. 28, 2006

(54) DUAL SPIRAL FLUORESCENT LAMP

(75) Inventor: Ellis Yan, Auburn, OH (US)

(73) Assignee: Technical Consumer Products, Inc., Aurora, OH (US)

(*) Notice: Subject to any disclaimer, the term of this patent is extended or adjusted under 35 U.S.C. 154(b) by 150 days.

(21) Appl. No.: 10/851,519

(22) Filed: May 24, 2004

(65) Prior Publication Data

US 2005/0258760 A1    Nov. 24, 2005

(51) Int. Cl.
*H01J 1/62*    (2006.01)
*H01J 61/067*    (2006.01)

(52) U.S. Cl. .............. 313/491; 313/574; 313/631; 313/493; 313/573; 313/623; 313/634

(58) Field of Classification Search ............... 313/634, 313/493, 318.01, 635, 317, 318, 491, 574, 313/631; 362/216

See application file for complete search history.

(56) References Cited

U.S. PATENT DOCUMENTS 5,256,935 A    10/1993    Dobashi et al.

2004/0207326 A1*    10/2004    Bajnok et al. .............. 313/634
2004/0263079 A1*    12/2004    Nakanishi et al. .......... 313/631

* cited by examiner

*Primary Examiner*—Edward J. Glick
*Assistant Examiner*—Thomas R. Artman
(74) *Attorney, Agent, or Firm*—Joseph H. Taddeo

(57) ABSTRACT

The present invention discloses a dual spiral fluorescent lamp that is smaller in volume than a conventional one. To provide for a reduced size compact fluorescent lamp, the end portions of the spiral glass tube are anchored into the holes within the cover of a bi-pin case. Inside of each end portion is a glass stem through which a pair of cathode support wires are passed. The cathode itself is welded to the extreme ends of each cathode support wire. To achieve the short-legged lamp, the cathode support wires lying between the cathode and the stem are bent downward at approximately 60 degrees from the vertically positioned stem. Therefore, by successfully avoiding the cathode coming in contact with the phosphor coating lining the interior of the tube, which may affect the natural lighting emitted by the fluorescent lamp, the two end portions of the fluorescent lamp of the present invention can be much shortened, resulting in a smaller volume than a conventional compact fluorescent lamp.

8 Claims, 4 Drawing Sheets

PRIOR ART

DUAL SPIRAL FLUORESCENT LAMP

FIELD OF INVENTION

The present invention relates to a dual spiral fluorescent lamp, and more particularly, to a dual spiral fluorescent lamp having a smaller volume, in relation to its form factor, than a conventional fluorescent lamp while maintaining the intensity of illumination level substantially the same.

BACKGROUND OF THE INVENTION

When a fluorescent lamp is energized, the hydrargyrum (mercury) vapor contained in the tube will be stimulated, giving out ultraviolet radiation. When the ultraviolet radiation strikes a phosphor coating lining the interior of the tube, visible light is produced. In order to obtain a certain brightness level of the visible light, the tube shall have a corresponding power rating, which is typically a function of the length of the tube.

The most commonly used tubes are of the straight type; either U-shaped, double U-shaped, or triple U-shaped.

At present, compact fluorescent lamps, such as the unispiral or dual spiral tube, are widely used because of their relatively small volume and energy saving characteristic. However, the two end portions of such kind spiral tubes, joining at the base of the fluorescent lamp are all vertical with respect to the base, which is electrically connected to a lamp socket. Such fluorescent lamps cannot be easily manufactured with having a condensed form factor that is commensurate with maintaining a small volume. Lamps made with having smaller volumes are more convenient for the users to handle.

The following prior art discloses the various aspects in the design of a reduced form factor, dual spiral fluorescent lamp and related prior art.

U.S. Pat. No. 5,256,935, granted Oct. 26, 1993, to Y. Dobashi et al., discloses a cold cathode mercury vapor discharge lamp that includes a bulb, a support wire within the bulb, and a cathode electrode having a pair of V-shaped electrode portions mounted in spaced, end to end relationship along the support wire. The electrodes include exterior surfaces facing towards the bulb walls, and interior surfaces facing towards the support wire. Getters are mounted on the exterior surfaces, and mercury discharge units are mounted on the interior surfaces. The two electrode portions are non-overlapping along the support wire.

A compact fluorescent lamp having an even smaller volume, entitled, "Dual Amalgam Dual Spiral Fluorescent Lamp" is disclosed in Chinese Patent Number ZL02215188.5. This fluorescent lamp does not have the two end portions and two electric pins. It is attached directly to a seat extending out from the tube, making the volume much smaller. However, the manufacture of such a fluorescent lamp having such a structure involves a complicated assembly process involving precise workmanship and can only be manufactured after the current machines are modified and adapted correspondingly, thereby increasing the manufacturing cost.

What is needed is a dual spiral compact fluorescent lamp having a condensed form factor and reduced volume for ease and comfort and handling and for simplicity of manufacture using no specialized tooling, while maintaining the same wattage rating and giving the corresponding brightness level. In this regard, the present invention fulfils this need.

It is therefore an object of the present invention to provide for a dual spiral fluorescent lamp having two end portions that are much shortened, thereby having a smaller contained volume than a conventional dual spiral lamp.

It is another object of the present invention to provide for a dual spiral fluorescent lamp having a more compact structure and form factor than a conventional dual spiral lamp.

It is a final object of the present invention to provide for a dual spiral fluorescent lamp that can to be easily manufactured using a conventional producing machine, without the need for re-tooling, thereby lowering the cost of manufacture.

SUMMARY OF THE PRESENT INVENTION

The present invention relates to a dual spiral fluorescent lamp, comprising a dual spiral tube having two end portions, (legs), joined into the receiving holes of a bi-pin case, where the two said end portions being all vertical with respect to the bi-pin case. At the bottom of the bi-pin case is an Edison styled, medium screw base, which connects electrically when screwed into a conventional lamp socket.

The inner surface of the spiral is lined with a coating of phosphor, after cleaning and treating the inside of the tube.

Each cathode is supported within each end portion by a pair of cathode wires passing through a stem and being fixed by the stem.

A portion of each pair of the cathode wires between the cathode and said stem is bent and formed outwardly at a downward angle approximating sixty degrees with reference to the vertically positioned stem.

A gas passage, found at the bottom of the said stem, is provided for removing the entrapped air from the interior of the tube and replacing the evacuated tube chamber with an inert gas. When completed the gas passage is subsequently sealed. As such, the invention provides a dual spiral fluorescent lamp having a dual spiral tube with two legs joined to a bi-pin housing. A cathode is supported within each said leg by a pair of cathode wires, and each pair of cathode wires is fixed by a stem within the tube, but each cathode is out of axial alignment with the longitudinal or lineal axis of its respective pair of cathode wires. Meanwhile, each leg has a linear section that proceeds to a curved section. And each pair of cathode wires is bent radially to extend into the curved section of each leg, whereby each cathode is positioned in the curved section. Each pair of cathode wires is bent at an angle in ranging from 20° to 70° from a longitudinal axis of its respective stem. The height of each leg is reduced proportionate to the angle to which each pair of cathode wires is bent; and, the tube volume is reduced in direct proportion to the reduction in height of the legs. Meanwhile the light intensitity produced is the same as the light intensity of a conventional dual spiral fluorescent lamp of the same input that does not have bent cathode wires with consequent shortened legs and reduced volume.

These and other features and advantages of the present invention will become more readily apparent from reading and understanding the following detailed description, together with the accompanying drawings and the appended claims.

DETAILED DESCRIPTION OF THE PREFERRED EMBODIMENT

With reference to the drawings, a preferred embodiment of the present invention will be fully described hereinafter.

Figure 1:
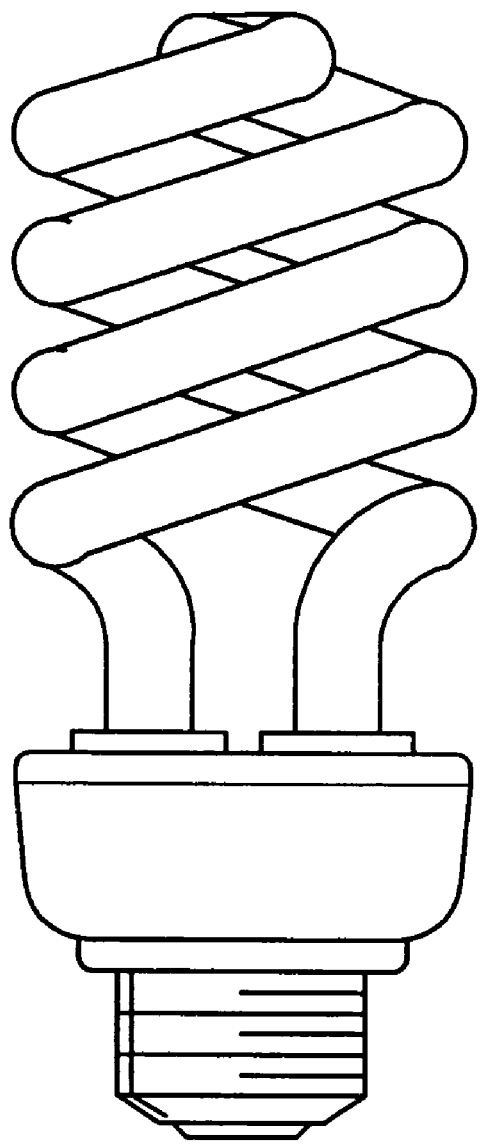
FIG. 1 is a side view of a prior art fluorescent lamp that illustrates a conventional dual spiral fluorescent lamp.
Figure 2:
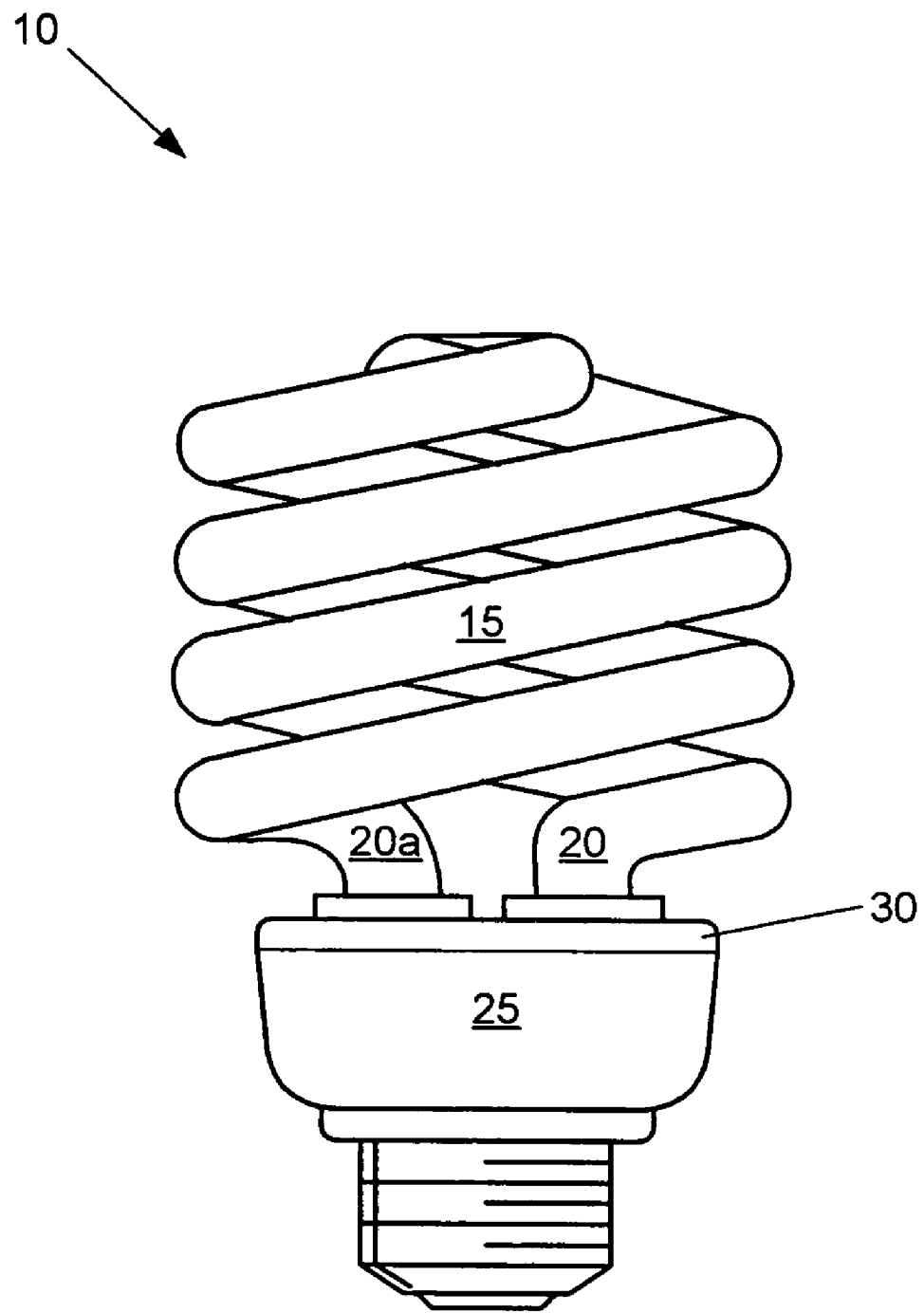
FIG. 2 is a side view of the dual spiral fluorescent lamp of the present invention.
Figure 3:
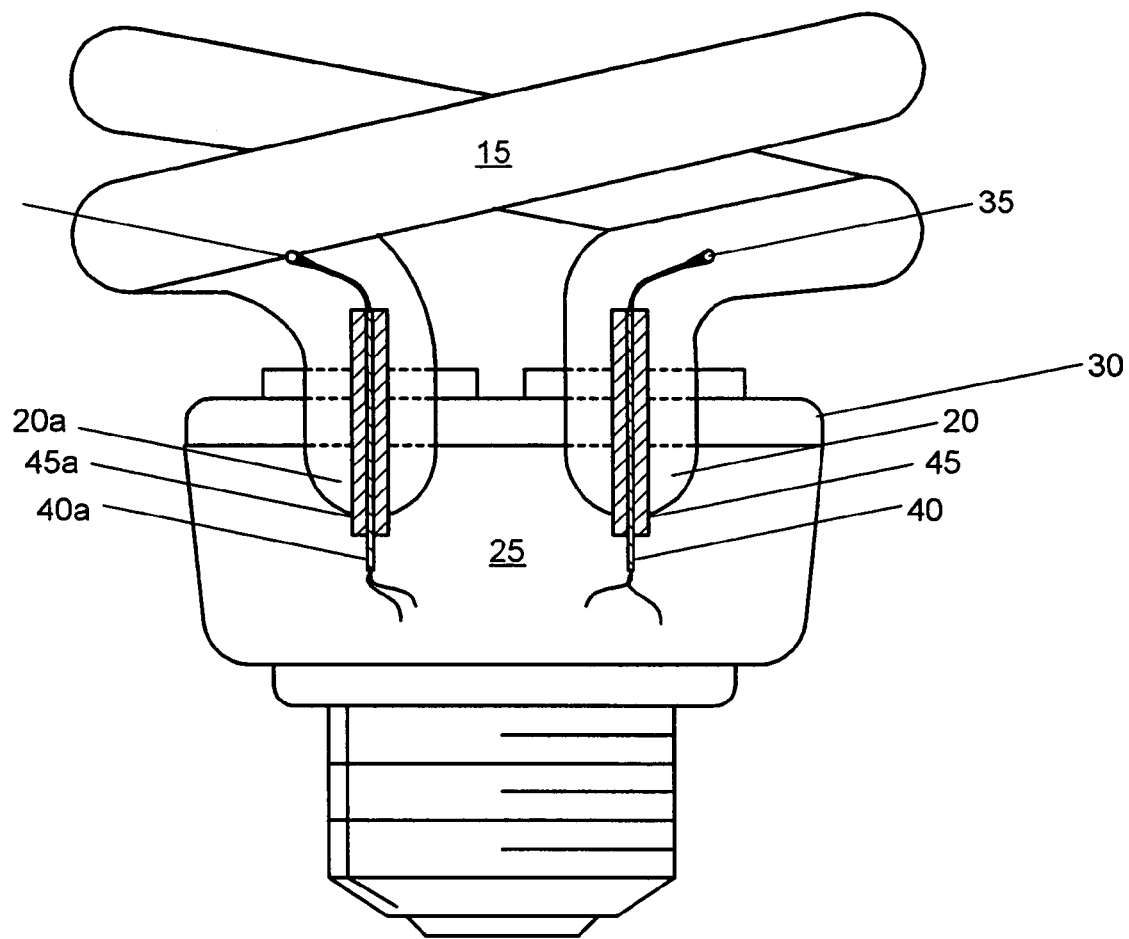
FIG. 3 is an exploded partial side sectional view of the dual spiral fluorescent lamp showing a pair of internally configured electrodes.

There is shown in FIGS. 2 and 3, an improved compact fluorescent lamp 10 of the present invention that has a dual spiral tube 15, having two end portions or legs 20 and 20a. The inner surface of the spiral tube 15 is coated with a phosphorescent powder prior to insertion of each cathode.

Upon assembly, the two end portions 20 and 20a are each inserted into two receiving holes in the lamp case cover 30, and accordingly anchored and secured therein. The first end portion 20 and the second end portion 20a remain in a vertical position with respect to the horizontal lamp base cover 30.

Figure 4:
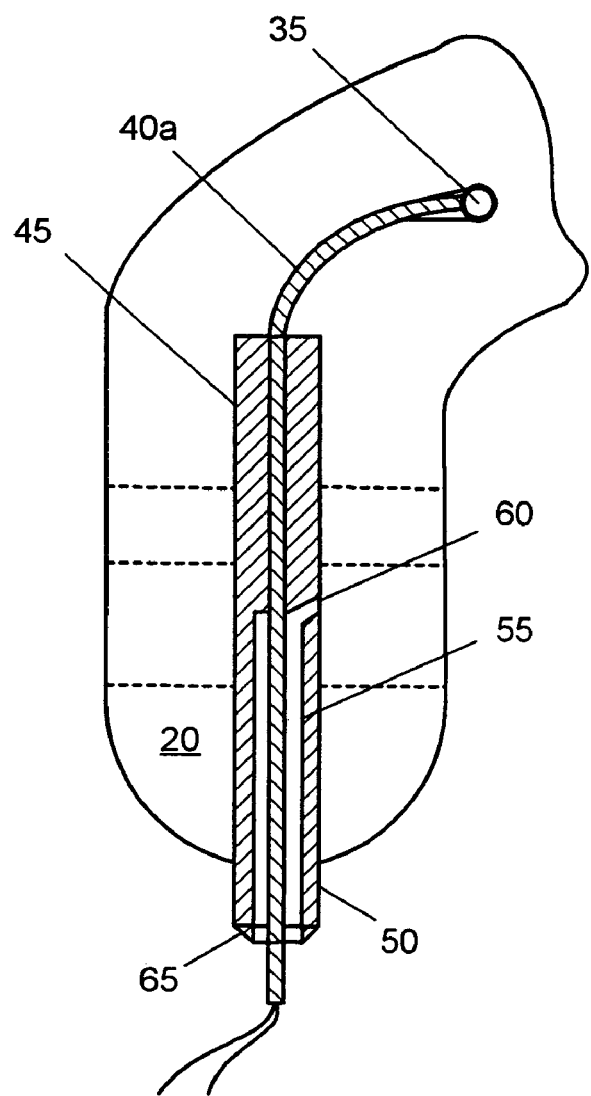
FIG. 4 is an exploded partial side sectional view of a cathode assembly of the dual spiral fluorescent lamp showing an internally configured electrode.
Figure 5:
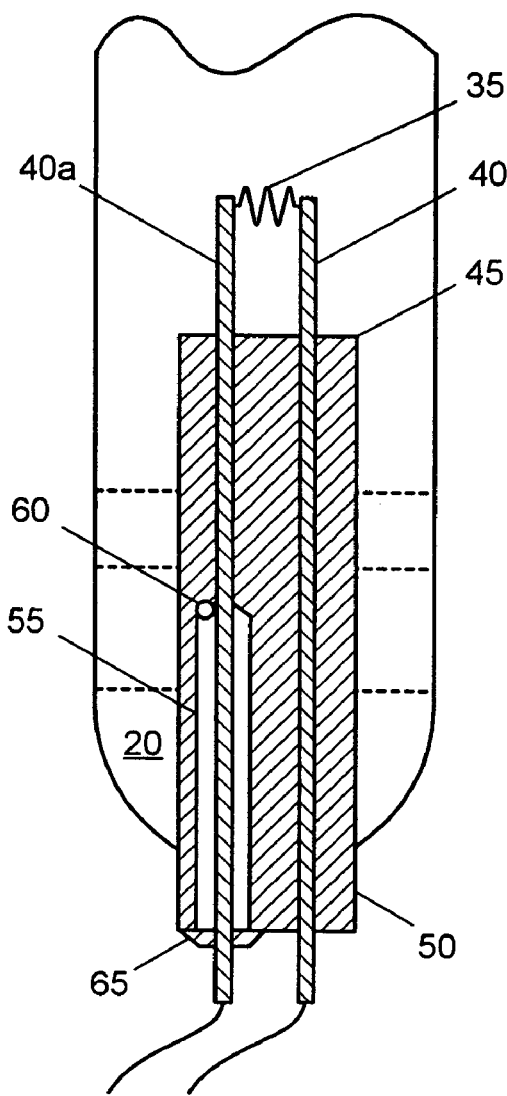
FIG. 5 is an exploded partial side sectional view, orthogonal to that of FIG. 4, of a cathode assembly of the dual spiral fluorescent lamp showing an internally configured electrode.

Turning now to FIGS. 3 through 5, the cathodes 35 are shown in each end portion 20 and 20a, being supported by a pair of cathode wires 40 and 40a, passing through stems 45 and 45a, and being maintained in a fixed position within the stems 45 and 45a respectively.

An airtight seal is provided between the end edge portion of the tube 20 and the stem 45, which closes and seals the tube end 20. Similarly, an airtight seal is provided between the end edge portion of the tube 20a and the stem 45a, which also closes and seals the tube end 20a.

The spiral tube 15 is then evacuated of all air within the tube 15 and replaced with an inert gas via the gas evacuation stem 50. The air contained in the interior of the spiral tube passes the gas evacuation orifice 60, into the gas evacuation chamber 55, and passing via the evacuation stem seal 65. Once the evacuation and gas replacement is completed, the gas evacuation stem 50 is subsequently sealed at stem seal 65.

Thus, by successfully avoiding the cathodes 35 from touching and engaging the phosphor coating, which may affect the natural lighting of the fluorescent lamp, the two fluorescent lamp end portions 20 and 20a, the fluorescent lamp of the present invention is much shortened, resulting in a volume substantially less than is available in conventional compact fluorescent lamps.

In addition the source of mercury vapor contained in the lamp may be liquid mercury, an amalgam, or a built-in amalgam.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. There may be other modifications or variations that can be made, but these modifications or variations can be made without detracting from the true spirit of this invention.

What is claimed is:

1. A dual spiral fluorescent lamp, comprising:
a dual spiral tube having two end portions, each of the end portions joined to a bi-pin case, said two end portions being vertical with respect to said bi-pin case which is electrically connected to a lamp socket;
a cathode supported within each said end portion by a pair of cathode wires passing through a stem and being fixed by said stem;
a gas passage defined in said stem for filling inert gas into a space enclosed by said tube; and
a phosphor lining provided on an inner surface of said tube; wherein a portion of each pair of said cathode wires between said cathode and said stem is bent down towards said stem.

2. A dual spiral fluorescent lamp as recited in claim 1, wherein a hydrargyrum source in said space comprises liquid mercury.

3. A dual spiral fluorescent lamp as recited in claim 2, wherein a hydrargyrum source in said space comprises a mercury amalgam.

4. A dual spiral fluorescent lamp as recited in claim 1, wherein a hydrargyrum source in said space comprises a built-in amalgam.

5. A dual spiral fluorescent lamp, comprising:
a dual spiral tube having two legs, each of the legs joined to a hi-pin housing, each leg having a linear section that proceeds to a curved section:
a cathode supported within each said leg by a pair of cathode wires, each pair of cathode wires fixed by a stem within said lube;
wherein each pair of cathode wires is bent radially, at an angle ranging from 20 degrees to 70 degrees from a longitudinal axis of its respective stem, to extend into the curved section of each leg, wherein each cathode is positioned in the curved section and out of an axial alignment with a lineal axis of its respective pair of cathode wires, that prevents touch or engagement of the cathodes with a phosphor coating of the legs, which may affect natural lighting of the fluorescent lamp.

6. The duel spiral fluorescent lamp as recited in claim 5, wherein the radially bent cathode wires provide a reduction in the height of each leg proportionate to the angle to which each pair of cathode wires is bent; and a tube volume is reduced it direct proportion to the reduction in height of the legs.

7. The dual spiral fluorescent lamp as recited in claim 6, wherein a light intensity produced is the same as the light intensity of a conventional dual spiral fluorescent lamp of the same input that does not have bent cathode wires with consequent shortened legs and reduced volume.

8. The dual spiral fluorescent lamp as recited in chum 7, further comprising a gas passage at a bottom of the said stem, for removing the entrapped air from the tube and replacing the evacuated tube with an inert gas.

* * * * *